April 28, 1925.
A. W. KNUTSON
ATTACHMENT FOR TRACTORS AND MOTOR VEHICLES
Filed Nov. 19, 1920     5 Sheets-Sheet 1
1,535,483
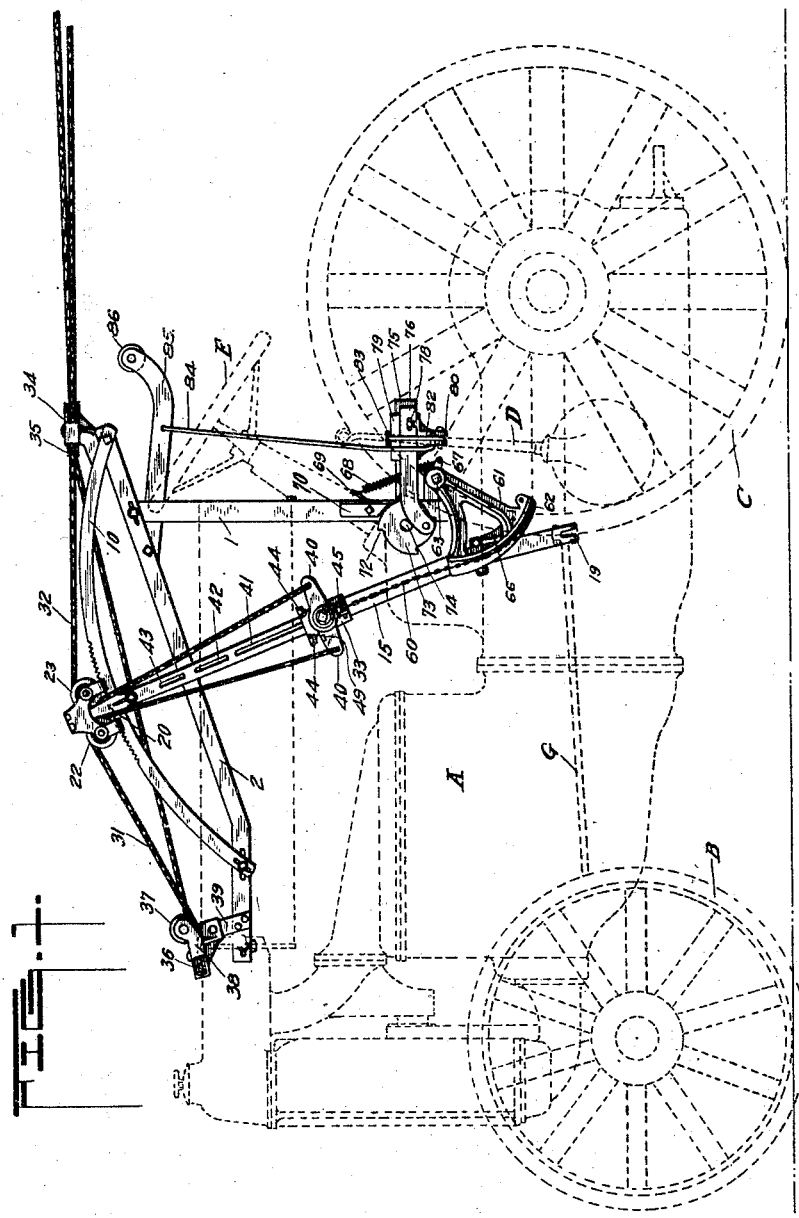
INVENTOR.
ATT'Y

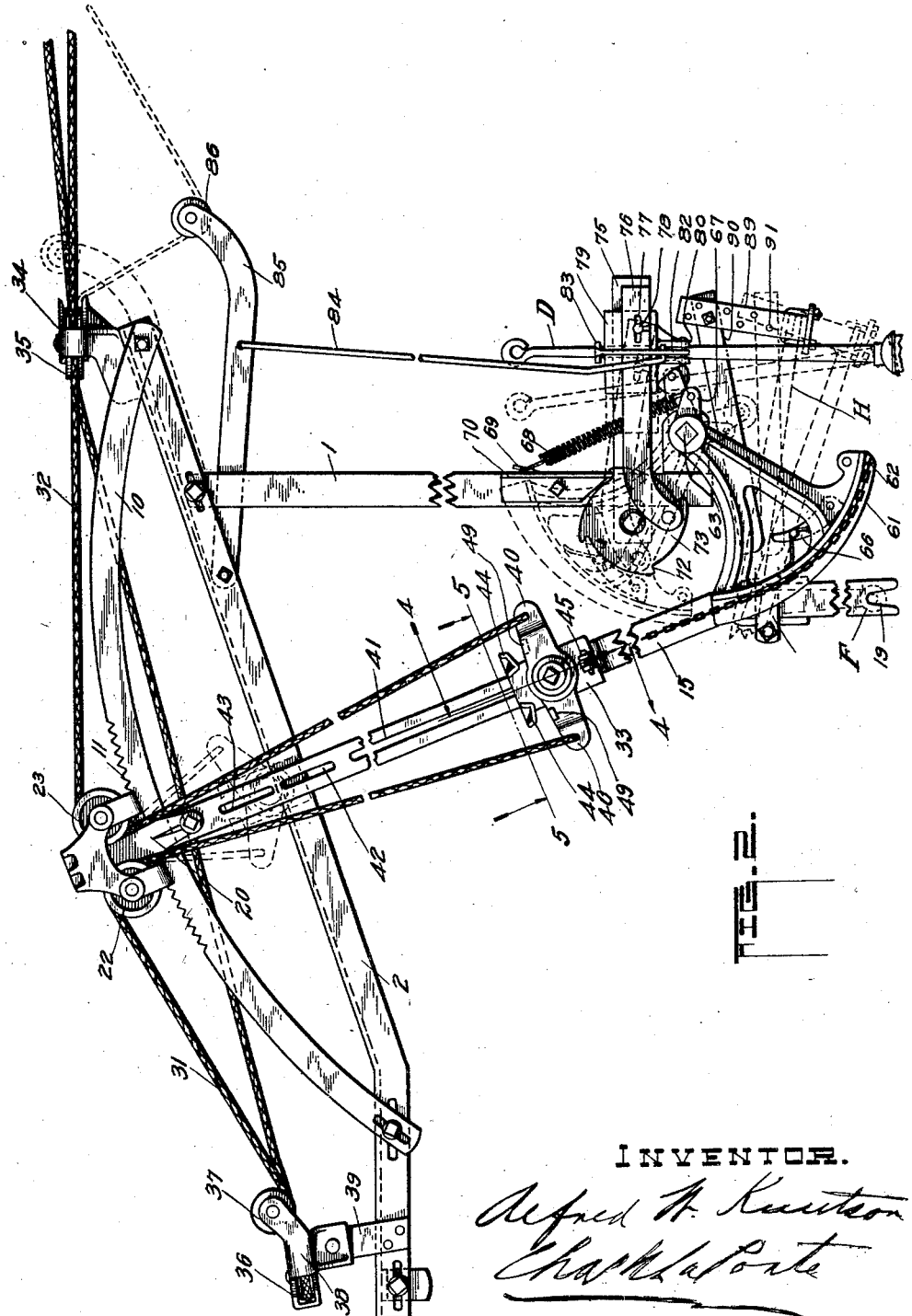

April 28, 1925.   1,535,483
A. W. KNUTSON
ATTACHMENT FOR TRACTORS AND MOTOR VEHICLES
Filed Nov. 19, 1920    5 Sheets-Sheet 3
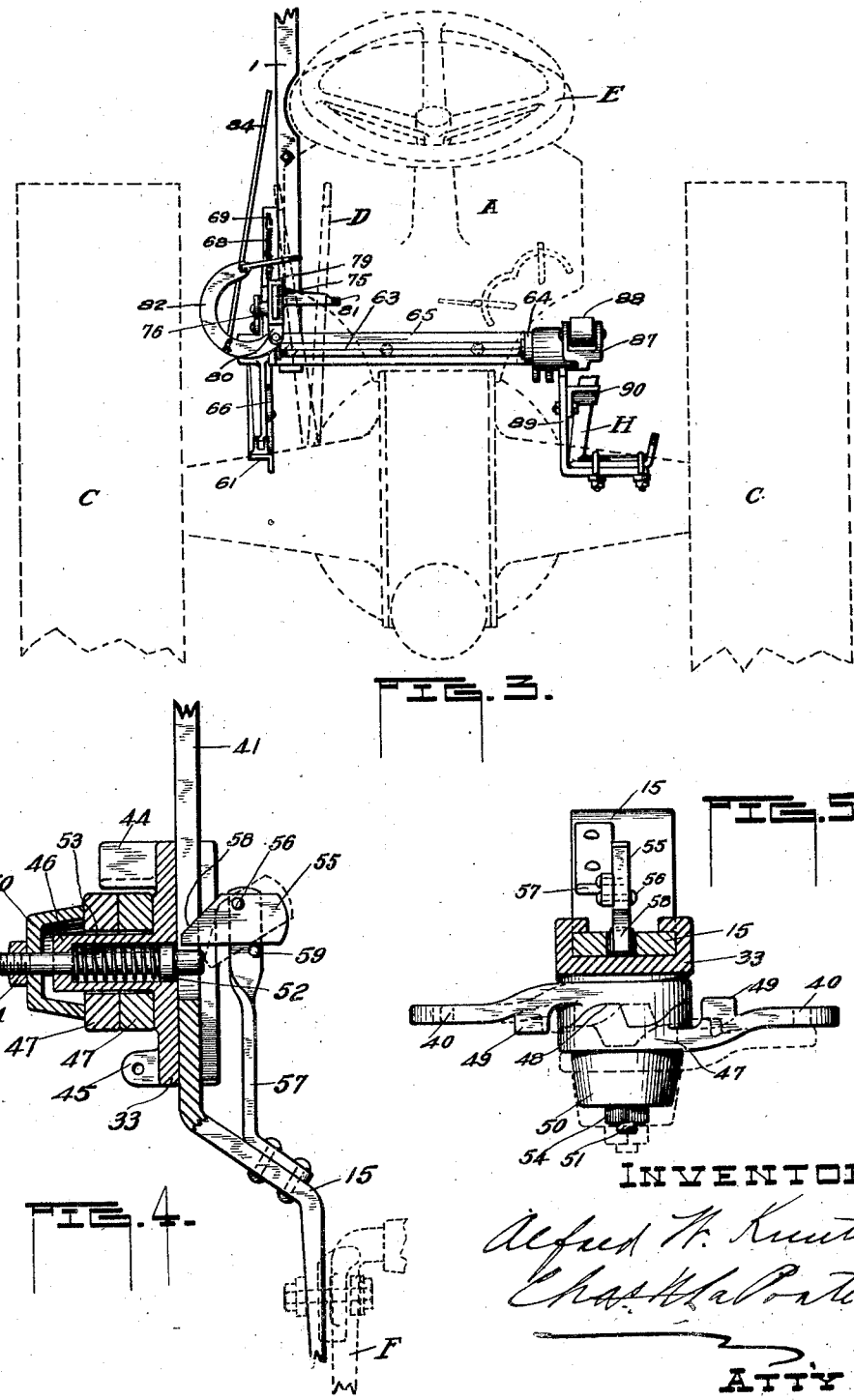

April 28, 1925.  1,535,483
A. W. KNUTSON
ATTACHMENT FOR TRACTORS AND MOTOR VEHICLES
Filed Nov. 19, 1920    5 Sheets-Sheet 4
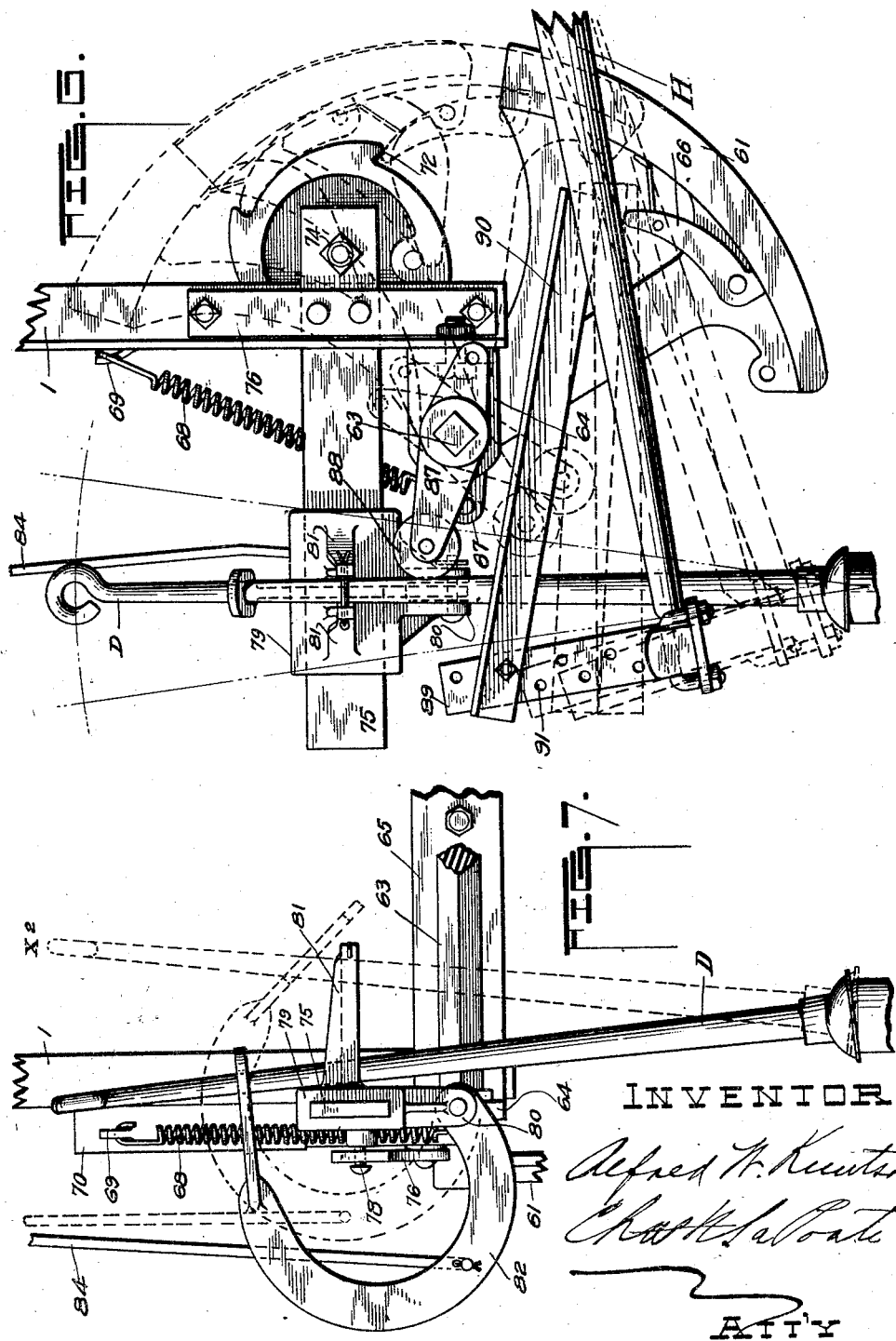

April 28, 1925.

A. W. KNUTSON 1,535,483

ATTACHMENT FOR TRACTORS AND MOTOR VEHICLES

Filed Nov. 19, 1920     5 Sheets-Sheet 5

INVENTOR.
Alfred W. Knutson
Chas. LaPorte
ATTY

Patented Apr. 28, 1925.

1,535,483

UNITED STATES PATENT OFFICE.

ALFRED W. KNUTSON, OF GALESBURG, ILLINOIS, ASSIGNOR TO ALVIN V. ROWE, OF GALESBURG, ILLINOIS.

ATTACHMENT FOR TRACTORS AND MOTOR VEHICLES.

Application filed November 19, 1920. Serial No. 425,261.

*To all whom it may concern:*

Be it known that I, ALFRED W. KNUTSON, a citizen of the United States, a resident of Galesburg, in the county of Knox and State of Illinois, have invented new and useful Improvements in Attachments for Tractors and Motor Vehicles, of which the following is a specification.

This invention has reference to rein or line control means for motor propelled vehicles, such as farm tractors, automobiles and the like, and such control preferably includes the gear shifting and clutch levers and steering appliances.

This application is a companion to that filed by me of even date herewith bearing Serial Number 425,260, which is directed primarily to a rein or line control for the steering appliances, whereas this application is directed to the rein or line control for the gear shifting lever and clutch lever, although it includes the control for the steering appliances.

The principal object of the invention is to provide a rein or line control attachment for the steering appliances, gear shifting lever and clutch lever, which is applicable to motor propelled vehicles or tractors now in use, as distinguished from vehicles or tractors which may embody rein or line controls that are especially built with or for use with such controls.

A further object of the invention is to provide a self contained attachment of the character and for the purposes referred to, which is formed for bodily securement to the tractor or like vehicle, and which includes rein or line control means for the gear shifting lever and the clutch lever. The operation of the clutch lever precedes the operation of the gear shifting lever when starting the tractor or shifting the gears to change the speed of the tractor, or reverse the tractor, whereby there can be no stripping of the gears. The attachment is arranged to permit selective operation of the gear shifting and clutch levers, either by the rein or line control, or by the levers themselves, in the ordinary and usual manner.

The present invention is designed particularly for attachment to a tractor of the "Fordson" type; however, the principle embodied will be found applicable to other and different types of tractors and motor vehicles.

That the invention may be more fully understood, reference is had to the accompanying drawings forming a part of the present description, illustrating a preferred embodiment of the invention, in which:—

Fig. 1 is a side elevation of a "Fordson" tractor, in dotted lines, with my rein or line control means for the steering appliances, gear shifting lever and clutch lever applied thereto;

Fig. 2 is a side elevation, partly broken away showing the attachment on a somewhat larger scale than that seen in Fig. 1, the dotted lines illustrating the movement of the gear shifting lever and clutch lever;

Fig. 3 is a rear elevation of the tractor, in dotted lines, and showing in elevation the gear shifting lever and clutch lever actuating means;

Fig. 4 is a sectional detail of parts, as the same would appear, if taken on the line 4—4 Fig. 2;

Fig. 5 is a sectional detail and plan view of parts, as the same would appear, if taken on the line 5—5 Fig. 2;

Fig. 6 is a detail side elevation of the actuating means for the gear shifting lever and clutch lever, as the same would appear looking in at the rear of the lower part, Fig. 2;

Fig. 7 is an end elevation looking in at the left hand end of Fig. 6;

Like characters of reference denote corresponding parts throughout the figures.

Figure 8:
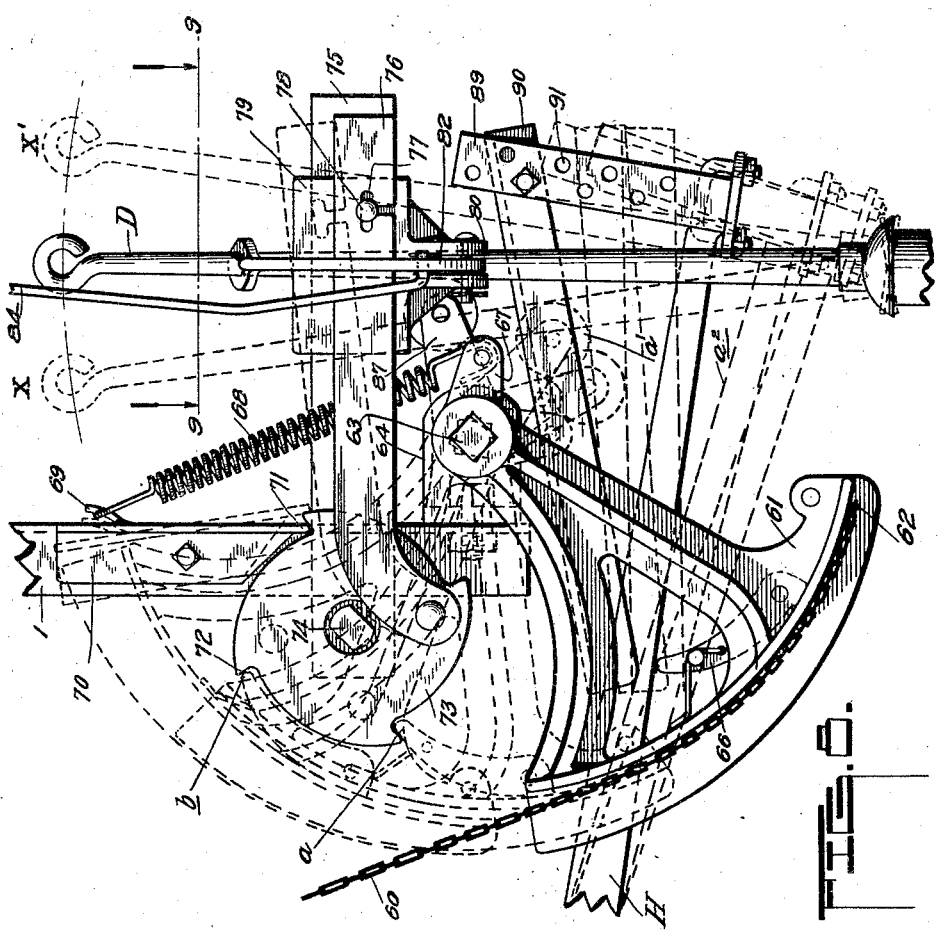
Fig. 8 is a front elevation of the mechanism shown in Fig. 6, and showing more in detail the mechanism seen in Fig. 2 for actuating the gear shifting lever and clutch lever.
Figure 9:
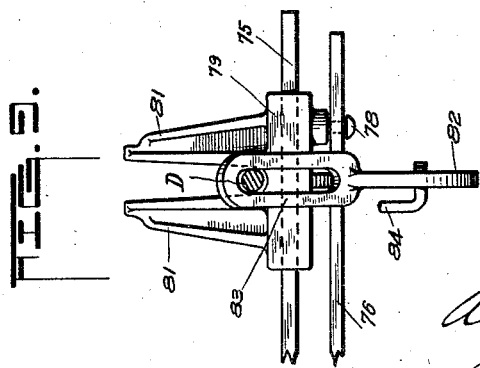
Fig. 9 is a detail cross-section, in plan, as the same would appear if taken on the line 9—9 Fig. 8.

In Fig. 1 the tractor A is preferably shown in dotted lines and includes among other structural features the steering wheels B, driving wheels C, gear shifting lever D, usual hand steering wheel E, which is operatively connected with the steering wheels through a crank-arm F, (Fig. 4) and connecting rod G, and the clutch lever H.

Certain structural features of the attachment are identical with those shown and described in the companion application bearing Serial Number 425260 relating primarily to the rein or line steering control. Such structural parts, briefly described are as follows: The bar 1 secured by suitable means in an upstanding position on one side at the rear of the tractor body or frame. The bar 2 extending lengthwise of the tractor, its forward end secured to the tractor body and its rear end crossing and being secured to the upper end of the bar 1. An arc shaped bar 10 connected at its forward and rear ends to the bar 2, by which it is supported, and having its upper edge provided with serrations or teeth 11 with which co-act certain dogs, not shown, but which are fully shown and described in the companion application bearing Serial Number 425260; and it is not thought necessary to go further into detail in this case. And a steering bar 15 which is suitably clamped to the crank-arm F, see Figs. 2 and 4, the lower end of said bar having a slot 19 to straddle a coupling, not shown, connecting the crank-arm F and the rod G. The bar 15 extends upward from the crank-arm F and crosses the arc shaped bar 10, the latter being positioned as if struck on an arc of a circle, the center of which is the axis of the crank-arm F, and as will be understood, when the bar 15 is oscillated, the crank-arm F is also oscillated, resulting in a reciprocation of the rod G and a steering of the steering wheels B to turn the tractor to the right or to the left.

To the upper end of the steering bar 15 is pivotally connected a casting 20 on which are journaled sheave wheels 22 and 23 and said casting has a co-acting relation with the dogs referred to, but not shown, which co-act with the teeth 11 on the bar 10 to provide a locking means for the steering bar, all of which is very clearly shown and described in the said companion application bearing Serial Number 425260.

Over the sheave wheel 22 passes a rein or line 31 and over the sheave wheel 23 passes a rein or line 32. Such lines extending downward and their ends connected, respectively, with ears 40 having a pivotal connection with an element 33 slidably carried on said bar 15. Both said reins or lines lead to the bar 15 from a remote point back of the tractor and from any machine or implement drawn thereby and from which the steering, gear shifting and clutch are controlled. Said reins or lines passing through a bracket 34 having a guiding sheave wheel 35. The rein or line 32 may go direct from the sheave wheel 35 to the sheave wheel 23 and element 33; whereas, the rein or line 31 before reaching the sheave wheel 22 first passes over a horizontally rotating guiding sheave wheel 36 and thence over a vertically rotating guiding sheave wheel 37. The bracket 34 is secured to the rear end of the bar 2, and the sheave wheels 36 and 37 are journaled in a bracket 38 connected to a support 39 secured to the forward end of said bar 2.

The steering bar 15 is preferably provided with a comparatively long longitudinal slot 41 and comparatively short longitudinal slots 42 and 43 thereabove. The element 33, which is a casting slidably carried on the bar 15, see Figs. 4 and 5, is normally positioned on the bar at or near the lower end of the slot 41 and on its front face is provided with spaced lugs or bosses 44 at its upper end and ears 45 at its lower end. Midway of its length, said casting is preferably provided on its front face with an outwardly projecting tubular sleeve 46 on which are journaled plates 47, 47 each having an ear 40 with which are connected respectively, the reins or lines 31 and 32. The contiguous faces of said plates are provided with reversely arranged cam surfaces 48, which, when the plates are turned by a pull on the reins or lines 31 and 32 will separate. The upward movement of the ears 40 is limited by lugs 49 on said ears 40 engaging with the lugs 44 on the casting 33. Enveloping the end of the sleeve 46 and bearing against the outside plate 47 is a collar 50 through which passes a stem or rod 51 which also passes through the sleeve 46 and adapted to project into and partly through the slots 41, 42 and 43 in the bar 15 when coincident therewith. On the stem or rod near its inner end and within the sleeve 46 is a collar 52 and on the rod, within the sleeve and bearing against the collar and end of the sleeve is a coil spring 53 normally acting to hold the stem or rod 51 protruding without the casting 33 and projecting through a slot in the bar 15. On the outer end of said stem or rod 51 is a nut 54 for adjusting the stem or rod within the sleeve. To lock the casting 33 in its lowermost position on the bar 15, see Fig. 4, a locking pawl 55 is provided pivotally connected at 56 to a bracket 57 and adapted to project into the slot 41 in said bar 15 and above the stem or pin 51. Said pawl has a tapered upper edge, as at 58 and while the pawl may tip downwardly it may not be tipped upwardly by reason of the fact its lower edge engages with a stop 59, see Fig. 4.

To steer the tractor, the driver will pull on either of the lines 31 or 32 and such pull will oscillate the casting 20 to release the upper end of the bar 15 from the toothed bar 10, as fully explained in the companion application bearing Serial Number 425,260, permitting him to oscillate the bar 15 and steer the tractor in the direction desired. Such pull on either of the reins or lines 31 or 32 will not be sufficient to release the stem or pin 51 to withdraw it from under the pawl 55 which would allow the casting 33 to be moved upwardly on the bar 15. This may only be accomplished by a direct pull upwardly on both lines or reins 31 and 32 at the same time, which will lift the ears 40 of the plates 47 and impart rotational movement to the latter and cause their cam faces 48 to ride on each other and forcibly separate said plates. Such movement will push the collar 50 outwardly and it will reciprocate the stem or pin 51 against the tension of the spring 53, withdrawing the end of said stem or pin from beneath the pawl 55 freeing the casting 33 so that it may be raised and lowered on the bar 15. Releasing the reins or lines 31 and 32 will allow the spring 53 to act to again project the stem or pin 51 into the slot 41 and into the path of the pawl 55, and as the casting 33 is lowered on the bar 15, said stem or pin 51 will engage with the tapered edge 58 of said pawl, tipping the pawl, as shown in dotted lines in Fig. 4, and as soon as the stem or pin 51 passes by the pawl, the latter returns to a position to lock the stem or pin and hold the casting 33 in its normal lowered position.

To the ears 45 on the casting 33 is connected a flexible member 60, such as a chain and said chain overlies the peripheral surface of a segment casting 61 and attached at one end thereto, at 62. The segment is secured to one end of a preferably square shaft 63 disposed transversely across the rear of the body of the tractor and suitably journaled in the angular ends 64 of a bar 65 bolted to the tractor body or frame, see Fig. 3. Said segment has pivotally connected thereto a spring held pawl 66 which functions as shown in full and dotted lines Figs. 7 and 8, to be further described. The shaft 63 has secured thereon a plate 67 to which is attached one end of a coil spring 68, which has its opposite end attached to a lip 69 on a plate 70 pivoted on the bar 1 of the attachment frame; said plate formed or provided with a tooth 71 which functions to engage with the teeth 72 on a rotatable disc 73 journaled on a stem 74 having a bearing in the end of a bar 75 disposed transversely of and secured to the bar 1 of the attachment frame. The bar 75 is preferably riveted to a strap 76 which is in turn bolted to the bar 1, see Fig. 6. I provide the disc 73, preferably, with four teeth 72, spaced equidistant around the disc and it is arranged that with each operation of the disc it may be caused to make one quarter turn. The disc has rotational movement imparted thereto through the engagement of the pawl 66 on the segment 61, as shown in dotted lines Figs. 6 and 8, the spring holding the pawl 66 to its work permitting the said pawl to ride back over the teeth of the disc 73 as the segment 61 returns to its normal or initial position. The tooth 71 on the plate 70 will act as a stop to prevent the disk 73 turning backward, and yet will yield to the forward rotational movement of the disc as the latter is turned as above explained. The upward pull on the reins or lines 31 and 32 and the chain 60 is against the tension in the spring 68 connected to the shaft 63 which is rotated as a result of such upward pull. This is supplemented by the spring in the clutch, not shown, which is under the control of the clutch lever H, and brought into action through the operation of the shaft 63 as will be further explained. To the disc 73 is pivotally connected a bar 76 which is reciprocated with each oscillation of the disc 73, and said bar at or near its opposite end and in its lower edge is provided with a T shaped slot 77 which will permit attachment and detachment of said bar with a pin 78 projecting from the front face of a casting 79 slidable on the bar 75; said casting formed or provided with depending ears 80 and with laterally projecting spaced fingers 81 up and between which the gear shifting lever D, projects. The said fingers 81 being long enough to allow for sidewise movement of the lever D when shifting to reverse gear without passing out from between said fingers. Pivotally connected with the ears 80 depending from the casting 79 is a preferably curved plate 82 having an elongated slotted end 83 through which passes the upper end of the gear shifting lever D, and said plate 82 has connected thereto the lower end of a rod 84, which, at its upper end is connected to a lever arm or bar 85, see Figs. 1 and 2 pivotally connected to the bar 2 and carrying a small sheave wheel 86 on its free end, for purposes to be explained.

On the end of the shaft 63, opposite to that on which the segment 61 is secured is an arm 87 on the rear end of which is journaled a roller 88, the forward end, in this structure having no particular function, except as a means of attachment to be employed in connection with a rein or line control for the fuel supply forming the subject matter of a companion application filed of even date herewith and bearing Serial Number 425,262. The roller 88 is used, when depressed, to actuate the clutch lever H to insure the release of the clutch before the shifting of the gears, as will more fully appear. To the free end of the clutch lever H is attached an arm or bar 89 with which is connected a bar 90 extending forwardly beneath the roller 88, and resting on the lever H, see Fig. 6. The arm or bar 89 is provided with a plurality of perforations 91 to provide for an adjustable connection of the bar 90 therewith. Such an adjustment will move the bar 90 closer to or farther from the roller 88 and change the time of contact between roller and bar relative to the shifting of the gears.

In the operation of the rein or line control, assuming the engine running and the gear shifting lever D in the neutral position shown in full lines in Fig. 8, to shift said lever to the dotted position X, the operator will pull back on the two reins or lines 31 and 32 to release the stem or pin 51 from the pawl 55, Fig. 4, releasing the casting 33 and permitting said casting to be raised on the bar 15 into the dotted position shown in Fig. 2. Such movement of the casting will rotate the segment 61 and shaft 63 to the dotted position shown in said Fig. 8. During the travel of the segment 61 from the full line position, Fig. 8, to the dotted line position where the pawl 66 is shown at $a$, the shaft 63 has rotated so as to cause the roller 88 to engage and move the bar 90 to the point $a'$ and the clutch lever H to the point $a^2$ releasing the clutch sufficiently to permit the shifting of the gears. Further movement of the segment 61, which raises the casting 33 to the extreme height shown in dotted lines in Fig. 2, will cause the pawl 66 to move from the point $a$ to the point $b$, Fig. 8, rotating the disc 73 a one-quarter turn, reciprocating the bar 76 and sliding the casting 79 on the bar 75 to shift the lever D from the full line position Fig. 8 to dotted line position X in said figure. Upon releasing the reins or lines 31 and 32 the spring 68 and the spring in the clutch, not shown, will return the parts to their normal position, except the lever D which remains at position X and the tractor in gear moving forward. To shift the lever D to the dotted line position X' to change the speed of the tractor, a direct pull on the reins or lines 31 and 32, in manner previously explained, will declutch the clutch and return the lever D again to neutral position, and another pull on the reins or lines 31 and 32 will cause the declutching of the clutch and the lever D moved to the dotted line position X'. In other words, a direct pull on the reins or lines 31 and 32 will move the lever H to declutch the clutch and subsequently shift the lever D to shift the gears. Each full pull on the reins or lines 31 and 32 rotates the disc 73 a one-quarter turn, such movement, if followed successively as described moving the lever D from neutral position to X, again to neutral, and then to X', and again back to neutral position, as it is believed will be fully understood.

Should the operator elect to control the gear shifting and declutching of the clutch through and by means of the usual hand lever D and foot lever H, he may do so by lifting the bar 76 off of the pin 78, leaving the parts free to be operated in their usual manner without interference of the other and foregoing described parts. As the lever D is then shifted the casting 79 is free to slide on the bar 75 with the movement of said lever.

Assuming now that it is desirable to reverse the gearing or to change to a speed other than previously mentioned, by moving the lever D from its neutral position Fig. 7 to the dotted line position $X^2$ in said figure, the operator will flip, preferably, the rein or line 31 under the sheave wheel 86 on the end of the lever bar 85, see dotted line Fig. 2, then as he pulls on the two reins or lines 31 and 32 he will raise the lever bar 85 to the dotted position shown in Fig. 2 which will impart rotational movement to the circular plate 82, see dotted line position Fig. 7 and shift the lever D to dotted line position $X^2$ ready for the operation of the lever D in the manner previously explained to shift said lever and cause the reversal of the gearing to move the tractor backward or to change to other and different speed. Unflipping the line or rein from the sheave wheel 86 will result in the lever D assuming the neutral position shown.

I have described the steering bar 15 as having slots 41, 42, and 43. During the usual operation of the parts controlling the gear shifting and clutch the slots 42 and 43 need not function at all; but assuming that the operator desires to stop the tractor by throwing out the clutch, and without disturbing the gearing, he may do so by a pull on the lines to raise the casting 33 until the stem or pin 51 is in a position where it may enter and engage the lower wall of the slot 42. To accomplish this result the operator will hold one rein or line substantially taught while releasing the other rein or line slightly to allow one of the plates 47 to have slight oscillatory movement relatively to the other thereby releasing the spring 53 to permit the stem or pin 51 to enter the slot 42. This will hold the casting 33 raised and the lever H moved only far enough to insure a declutching of the clutch. To resume operations, a slight pull on the reins or lines will release the stem or pin 51 when said casting may slide downwardly allowing the spring 68 and the spring in the clutch to cause re-engagement of the clutch, and the tractor to move.

There may be time when the operator would like to release the clutch and move the lever D to neutral position without the operating parts moving back farther than where the pawl 66 is at the point $a$, Fig. 8, in which position further upward movement of the segment 61 and the pawl 66 will cause a one-quarter turn of the disc 73 to put the tractor in motion. He may do this by pulling on the lines so as to raise the casting 33 to the dotted line position in Fig. 2, when the stem or pin 51 may be released so as to enter the slot 43 and rest on the base of such slot. When again ready for the starting of the tractor a very slight pull on the lines moving the pawl from the position $a$ to the position $a'$ Fig. 8, will give the desired result.

What I claim is:—

1. An attachment for a standard tractor to convert the gear shifting and clutch control to rein control, including means to operate the usual clutch lever, means to operate the usual gear shifting lever, and rein means common to and adapted for actuating both said operating means, said operating means having a predetermined movement relative to each other whereby the clutch is released in advance of the movement of the gear shifting lever.

2. An attachment for a standard tractor to convert the gear shifting and clutch control to rein control, including means to operate the usual clutch lever, means to operate the usual gear shifting lever, spring means controlling the normal inoperative positions of said operating means, and rein means common to and adapted for actuating both said operating means, said operating means having a predetermined movement relative to each other, whereby the clutch is released in advance of the movement of the gear shifting lever.

3. An attachment for a standard tractor to convert the gear shifting and clutch control to rein control, including means to operate the usual clutch lever to release the clutch, means to operate the usual gear shifting lever to shift the gears for change of speed, rein means common to and adapted for actuating both said operating means, said operating means having a predetermined movement relative to each other, whereby the clutch is released in advance of the movement of the gear shifting lever, and means also operated by said rein means for positioning said gear shifting lever to reverse said gearing.

4. An attachment for a standard tractor to convert the gear shifting and clutch control to rein control, including means to operate the usual clutch shifting lever, means to operate the usual gear shifting lever, rein means common to and adapted for actuating both said operating means, said operating means having a predetermined movement relative to each other, whereby the clutch is released in advance of the movement of the gear shifting lever, and means permitting the clutch to be released without disturbing the gear shifting lever or gearing and for locking the rein actuating means to hold said clutch in declutched position.

5. An attachment for a standard tractor to convert the gear shifting and clutch control to rein control, including means for operating the usual clutch shifting lever, means to operate the usual gear shifting lever, a shaft connected with said clutch lever operating means, rein means, means connecting said rein means with said shaft, and means connected with said shaft for actuating said gear shifting lever operating means, said last mentioned actuating means so timed in its operative relation to the operation of said clutch lever as to operate subsequently thereto and after the release of the clutch.

6. In an attachment of the character described, in combination, a shaft, means on said shaft to move a clutch lever to inoperative position, means to move a gear shifting lever from neutral position to speed changing positions and reverse, a member connected with said shaft arranged for engagement with said gear shifting means, and rein means connected with said shaft for operating the latter.

7. In an attachment of the character described, in combination, a frame for securement to a tractor, a shaft, means on the shaft to operate a clutch lever, means operatively mounted on said frame and connected with a gear shifting lever for moving the latter to different positions, a member on said shaft, rein means connected with said member, and means operated by said member for imparting movement to said gear shifting lever operating means.

8. In an attachment of the character described, in combination, a frame for securement to a tractor, a shaft, a crank-arm on said shaft having a roller to ride against and depress a clutch shifting lever, a slidable member arranged for connection with a gear shifting lever, a revoluble toothed disc arranged for connection with said slidable member to reciprocate the latter, a segment on said shaft, a pawl carried by said segment for engagement with said disc to impart rotational movement thereto, and rein means connected with said segment.

In witness whereof, I have hereunto affixed my hand this 13 day of November, 1920.

ALFRED W. KNUTSON.